Aug. 25, 1931.     A. W. AGEE     1,820,107
ACOUSTIC DEVICE
Filed April 22, 1930
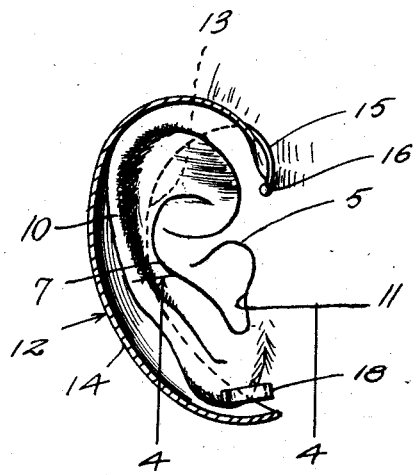
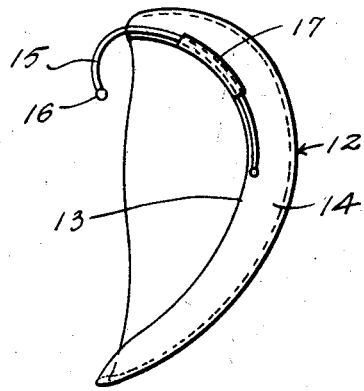
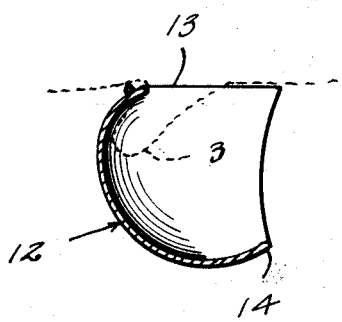
Inventor
A. W. Agee
By Watson E. Coleman
Attorney Patented Aug. 25, 1931

1,820,107

UNITED STATES PATENT OFFICE

ALFRED W. AGEE, OF OGDEN, UTAH

ACOUSTIC DEVICE

Application filed April 22, 1930. Serial No. 446,363.

This invention relates to acoustic devices, and has for one of its objects to provide a device of this character which consists of a novel artificial ear adapted to be applied to the natural external ear for the purpose of directing the sound waves into the internal ear, whereby to effect a substantial improvement in the hearing of those persons who are partly deaf.

The invention has for a further object to provide an artificial ear of the character stated which shall be made of resilient material to permit its vibration by sound waves and thus effect a substantial amplification of the sound waves.

The invention has for a still further object to provide an artificial ear which shall embody means through the medium of which it may be secured to the external ear without the aid of a head band or the like and through the medium of which it may be secured to ears of different size.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in side elevation and partly in vertical section illustrating the application of the artificial ear;

Figure 2 is a view in side elevation of the artificial ear, and;

Figure 3 is a sectional view taken on a plane extending transversely through the artificial ear and a portion of the natural external ear.

Referring in detail to the drawing, 10 designates a natural ear, 11 the tragus thereof, and 12 the artificial ear. The artificial ear 12 is substantially in the form of a spherical segment and is of hollow formation to receive the external ear 10. The inner or rear edge 13 of the artificial ear 12 contacts with and fits snugly against the external ear 10 where it joins the head. The outer or forward edge 14 of the artificial ear 12 occupies a position slightly in advance or in alinement with the tragus 11 of the external ear 10. The artificial ear 12 secured in applied position by a flexible hook 15 which engages about the upper portion of the external ear 10 where it joins the head. The hook 15 is provided at its front end with a spherical head 16 to prevent it from injuring the external ear 10 and to also assist it in securing a firm grip thereon. The hook 15 is slidably mounted in a loop 17 carried by the rear edge 13 of the artificial ear 12 in order to permit it to be adjusted with respect to the artificial ear and thus adapt it for engagement with outer ears of different sizes.

Due to its formation, the artificial ear 12 encloses the external ear 10 and it has its front side fully open to permit sound waves to freely enter the same. The artificial ear 12 may be made of bakelite or pyrolin, and the artificial ear 12 is flexible so as to enable the sound waves to vibrate the same.

In practice, the artificial ear is applied to the external ear 10 by positioning the inner edge 13 of the artificial ear in contact with the external ear where it joins the head and by thereafter moving the hook 15 into engagement with the external ear. The artificial ear 12 intercepts the sound waves and directs them into the natural ear. As the artificial ear 12 will be vibrated by the sound waves, the latter will be materially amplified. The artificial ear 12 may be of flesh color so as to render it inconspicuous. If desired, the artificial ear may be provided at the lower end of its inner edge 13 with a clasp 18 adapted to engage the lower end of the external ear 10 in order to hold it in place when it is worn by workmen.

It should be apparent from the foregoing description, taken in connection with the accompanying drawings, that I have provided an acoustic device which will materially improve the hearing of those who are partly deaf, which may be easily and quickly and firmly secured in place and as easily and quickly removed, which will not annoy the wearer, and which may be manufactured and sold at comparatively little cost.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. An acoustic device comprising an artificial ear adapted to be applied to the external ear in surrounding relation thereto and having its front side open and rear side closed, the artificial ear being substantially in the form of a spherical segment and having its rear edge curved to conform to the curvature of the external ear where it contacts with the head, and a hook carried by the artificial ear and adapted to engage the external ear to secure the former in place.

2. An acoustic device comprising an artificial ear adapted to be applied to the external ear in surrounding relation thereto and having its front side open and rear side closed, the artificial ear being substantially in the form of a spherical segment and having its rear edge curved to conform to the curvature of the external ear where it contacts with the head, and a hook adjustably carried by the artificial ear and adapted to engage the external ear to secure the former in place.

3. An acoustic device comprising an artificial ear adapted to be applied to the external ear in surrounding relation thereto and having its front side open and its rear side closed, and a flexible hook carried by the artificial ear and adapted to engage the external ear to secure the former in place.

In testimony whereof I hereunto affix my signature.

ALFRED W. AGEE.